(12) United States Patent
Wesling

(10) Patent No.: US 11,753,106 B2
(45) Date of Patent: Sep. 12, 2023

(54) BICYCLE DERAILLEUR AND CONNECTION

(71) Applicant: SRAM, LLC, Chicago, IL (US)

(72) Inventor: Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 110 days.

(21) Appl. No.: 17/362,233

(22) Filed: Jun. 29, 2021

(65) Prior Publication Data

US 2021/0394865 A1  Dec. 23, 2021

Related U.S. Application Data

(60) Continuation of application No. 16/797,994, filed on Feb. 21, 2020, which is a division of application No. 15/891,036, filed on Feb. 7, 2018, now Pat. No. 10,875,601.

(60) Provisional application No. 62/457,525, filed on Feb. 10, 2017.

(51) Int. Cl.

| B62M 6/40 | (2010.01) |
|---|---|
| B62J 43/30 | (2020.01) |
| B62J 43/20 | (2020.01) |
| B62M 9/122 | (2010.01) |
| B62M 9/132 | (2010.01) |
| B62M 25/08 | (2006.01) |

(52) U.S. Cl.
CPC .............. *B62M 6/40* (2013.01); *B62J 43/20* (2020.02); *B62J 43/30* (2020.02); *B62M 9/122* (2013.01); *B62M 9/132* (2013.01); *B62M 25/08* (2013.01)

(58) Field of Classification Search
CPC ....... B62M 9/122; B62M 9/132; B62M 25/08
USPC ...................................... 474/80, 82
See application file for complete search history.

(56) References Cited

U.S. PATENT DOCUMENTS

| 3,855,534 A * | 12/1974 | Holcomb | ............. H04B 1/3883 |
| | | | 429/98 |
| 4,605,240 A * | 8/1986 | Clem | ..................... B62M 25/08 |
| | | | 280/238 |
| 5,599,244 A * | 2/1997 | Ethington | ............... B62M 9/123 |
| | | | 474/81 |
| 5,876,242 A * | 3/1999 | Williams | ............ H01M 50/209 |
| | | | 439/500 |
| 6,741,045 B2 * | 5/2004 | Kitamura | ................. B60L 50/20 |
| | | | 375/135 |
| 7,108,097 B1 * | 9/2006 | Bolton | ..................... B62M 6/55 |
| | | | 280/288.1 |
| 9,637,195 B2 | 5/2017 | Fukao et al. | |

(Continued)

FOREIGN PATENT DOCUMENTS

| CN | 105848994 A | 8/2016 |
| EP | 2865589 A1 | 4/2015 |

(Continued)

*Primary Examiner* — Henry Y Liu

(57) ABSTRACT

An apparatus for a bicycle includes an intermediate power connector configured for transmitting power between a bicycle component and a power source positioned remote from the bicycle component. The intermediate power connector has a coupling portion configured for removable attachment to a connecting portion of the bicycle component. The bicycle component can also include a battery having a battery coupling portion configured for removable attachment to the connecting portion of the bicycle component. The battery and the intermediate power connector can be selectively attachable to the bicycle component to provide power thereto.

14 Claims, 18 Drawing Sheets

(56) References Cited

U.S. PATENT DOCUMENTS

| | | | |
|---|---|---|---|
| 9,676,444 B2* | 6/2017 | Shipman | B62M 25/08 |
| 10,023,139 B2 | 7/2018 | Watarai et al. | |
| 10,053,189 B2* | 8/2018 | Pasqua | B62M 9/132 |
| 10,086,907 B2* | 10/2018 | Tachibana | H04B 1/3827 |
| 10,370,060 B2* | 8/2019 | Komatsu | B62K 19/36 |
| 10,843,757 B2* | 11/2020 | Komatsu | B62K 25/10 |
| 11,066,126 B2* | 7/2021 | Kurokawa | B62M 25/08 |
| 11,148,756 B2* | 10/2021 | Liao | B62J 43/30 |
| 2002/0128106 A1 | 9/2002 | Kitamura | |
| 2003/0022743 A1 | 1/2003 | Meggiolan | |
| 2004/0166972 A1* | 8/2004 | Takeda | B62M 25/045 474/78 |
| 2004/0195025 A1 | 10/2004 | Kitamura | |
| 2006/0186631 A1 | 8/2006 | Ishikawa | |
| 2007/0037645 A1* | 2/2007 | Ishikawa | B62M 25/08 474/70 |
| 2007/0099442 A1 | 5/2007 | Nishimoto | |
| 2007/0191159 A1* | 8/2007 | Fukuda | B62M 9/1242 474/70 |
| 2009/0210118 A1* | 8/2009 | Takamoto | B62M 25/08 701/49 |
| 2009/0215561 A1* | 8/2009 | Fukuda | B62M 9/122 474/82 |
| 2010/0206652 A1* | 8/2010 | Kielland | B62K 3/005 180/220 |
| 2011/0232932 A1* | 9/2011 | Bantie | H01M 50/20 362/183 |
| 2012/0265414 A1* | 10/2012 | Cheng | B62M 9/123 701/55 |
| 2012/0322591 A1* | 12/2012 | Kitamura | B62M 9/122 474/80 |
| 2014/0087901 A1* | 3/2014 | Shipman | B62M 9/1242 429/100 |
| 2014/0114538 A1* | 4/2014 | Shipman | B62M 9/132 474/80 |
| 2014/0303859 A1 | 10/2014 | Miki et al. | |
| 2014/0358386 A1* | 12/2014 | Cracco | B62M 9/122 701/51 |
| 2015/0111675 A1 | 4/2015 | Shipman et al. | |
| 2015/0180517 A1 | 6/2015 | Abe et al. | |
| 2016/0009341 A1* | 1/2016 | Watarai | B62M 25/08 701/51 |
| 2016/0167733 A1* | 6/2016 | Kawakami | B62M 6/70 180/220 |
| 2016/0257269 A1* | 9/2016 | Watarai | B62J 43/13 |
| 2016/0280327 A1* | 9/2016 | Tiso | H02J 7/34 |
| 2017/0021897 A1* | 1/2017 | Bortolozzo | B62J 45/412 |
| 2017/0029057 A1* | 2/2017 | Kato | B62J 6/16 |
| 2017/0101155 A1* | 4/2017 | Tachibana | B62K 25/286 |
| 2017/0101160 A1 | 4/2017 | Nishino | |
| 2017/0101162 A1* | 4/2017 | Tachibana | B62M 25/08 |
| 2017/0113759 A1* | 4/2017 | Watarai | B62J 43/30 |
| 2017/0120983 A1* | 5/2017 | Komatsu | B62K 25/30 |
| 2017/0158285 A1* | 6/2017 | Tachibana | B62M 9/122 |
| 2018/0001960 A1* | 1/2018 | Pasqua | B62M 25/08 |
| 2018/0009508 A1* | 1/2018 | Suzuki | B62M 6/50 |
| 2018/0037294 A1* | 2/2018 | Kurotobi | B62K 25/04 |
| 2018/0043968 A1 | 2/2018 | Sala | |
| 2018/0072373 A1* | 3/2018 | Kishita | B62M 6/40 |
| 2018/0076840 A1* | 3/2018 | Masuda | H04B 1/3827 |
| 2018/0178881 A1* | 6/2018 | Miglioranza | B62M 9/122 |
| 2018/0290709 A1* | 10/2018 | Tsuchizawa | B62M 6/50 |
| 2018/0354586 A1* | 12/2018 | Komatsu | B62M 9/1242 |
| 2018/0362106 A1* | 12/2018 | Miles | B62J 1/08 |
| 2018/0370594 A1* | 12/2018 | Foley | B62M 6/65 |
| 2019/0002053 A1* | 1/2019 | Kakinoki | B62K 19/40 |
| 2020/0216144 A1* | 7/2020 | Hamed | B62K 23/06 |
| 2021/0006278 A1* | 1/2021 | Masuda | B62L 3/02 |

FOREIGN PATENT DOCUMENTS

| | | |
|---|---|---|
| JP | H-298806 A | 11/1997 |
| WO | 2015021196 A1 | 2/2015 |

* cited by examiner

Interface

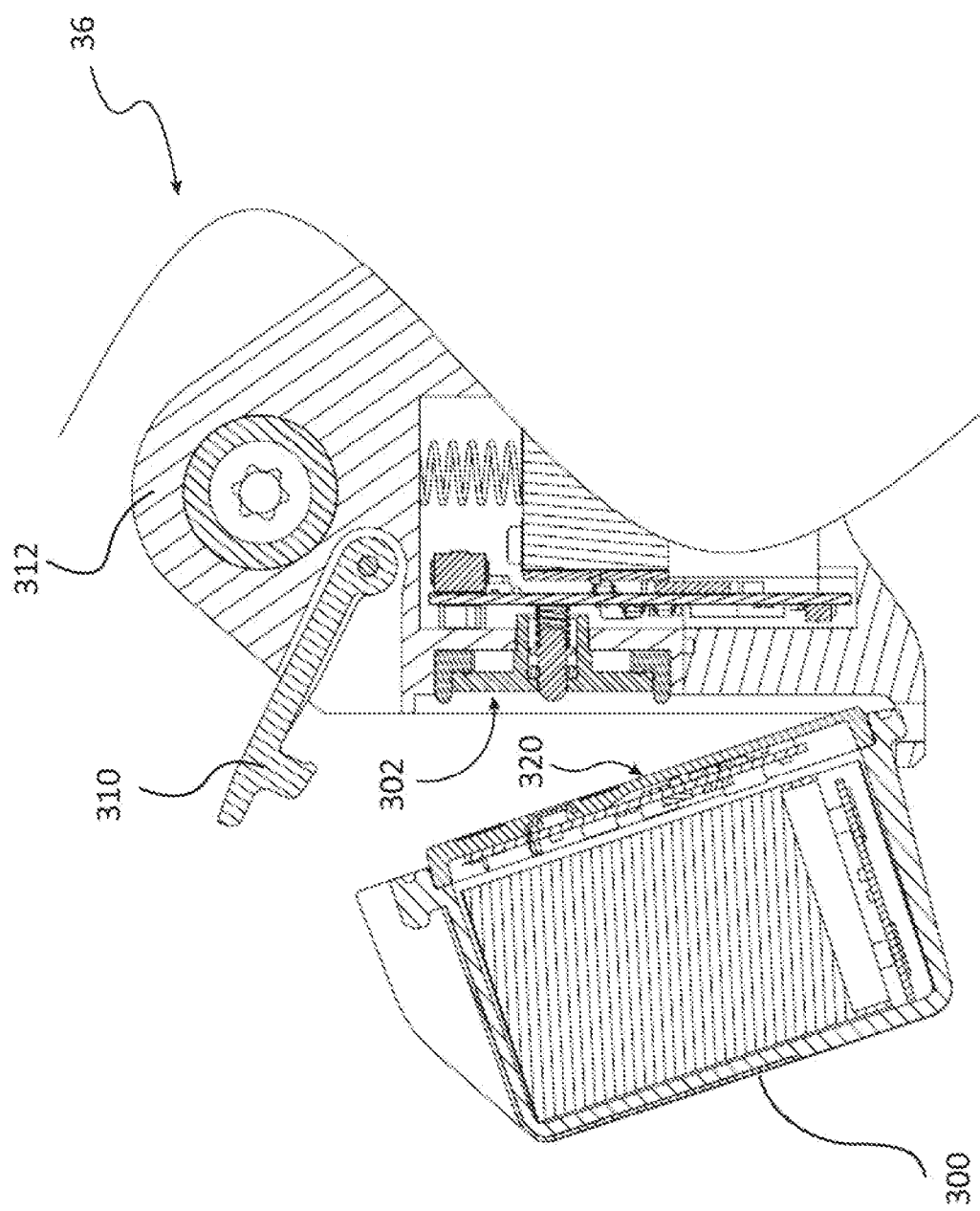

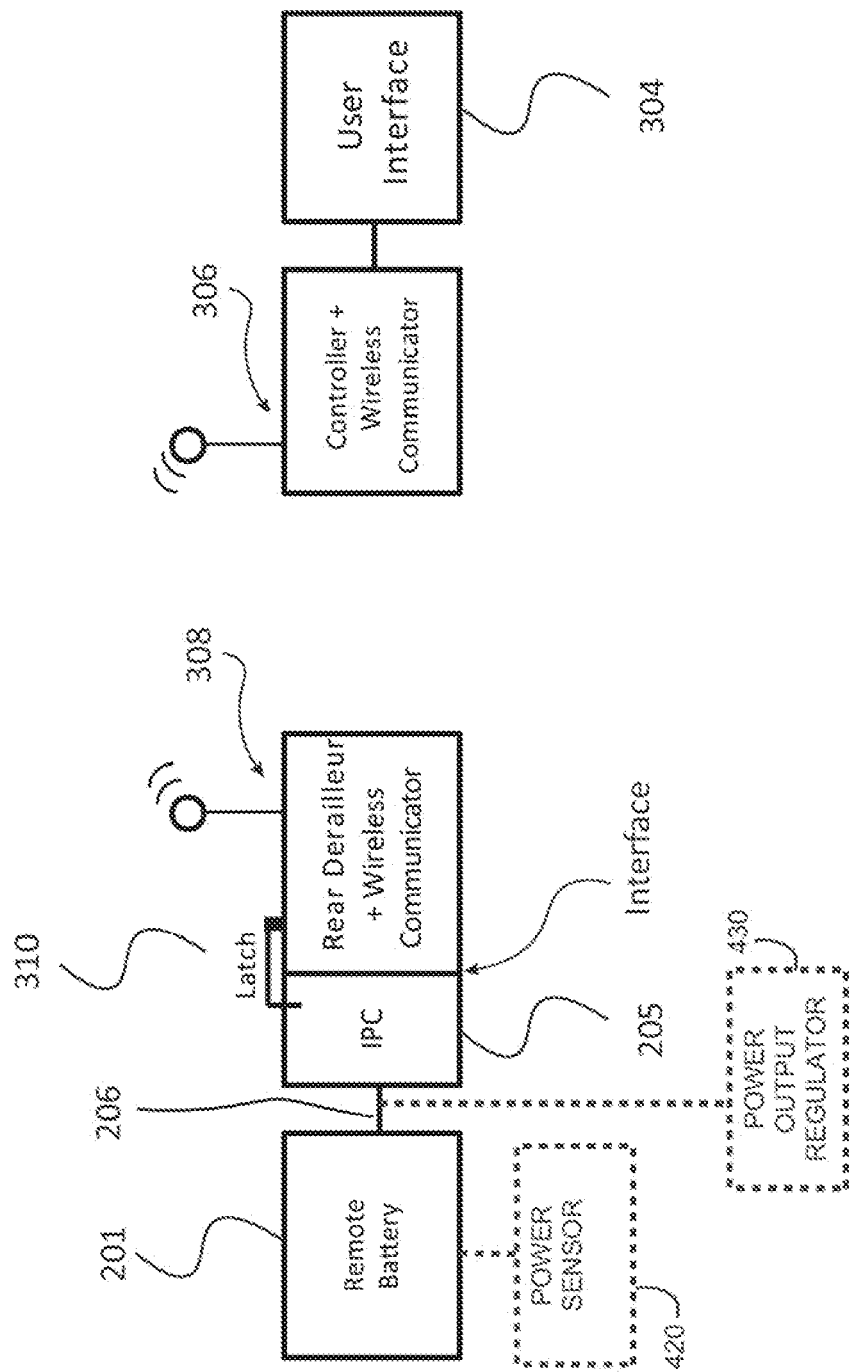

BICYCLE DERAILLEUR AND CONNECTION

RELATED APPLICATIONS

This application is a continuation of and claims the benefit of the filing date of U.S. Utility application Ser. No. 16/797,994, filed Feb. 21, 2020, which claims the benefit of the filing date of U.S. Utility application Ser. No. 15/891,036, filed Feb. 7, 2018, now U.S. Pat. No. 10,875,601, issued Dec. 29, 2020, which claims the benefit of the filing of U.S. Provisional Application Ser. No. 62/457,525, filed Feb. 10, 2017, the entirety of which is incorporated by reference herein and relied upon.

FIELD OF THE INVENTION

This invention generally relates to bicycle derailleurs, and more specifically relates to an electric derailleur that can be powered by an integrated battery or a remote battery and to the geometry used for implementation.

BACKGRUND

Electric shifting systems for bicycles have batteries. In some cases, it is a common battery that powers all the components. Generally, the cables that transmit the power also transmit the control signals. U.S. Pat. No. 6,741,045 B2, for example, uses the same wire of a cable for power and for control. This is commonly done to minimize the number of conductors in a bundled cable. More recently, wireless systems have been introduced that have individual batteries at each component. The control signals should also be wireless to achieve the full benefit of a wireless system. Therefore, each wireless derailleur may have a wireless receiver and a battery, such as a rechargeable and removable battery. Wireless systems for use in bicycle shifting systems are known, for example in US Patent Application Publication Number 2015/0111675 A1, which is herein incorporated by reference in its entirety.

SUMMARY

In an embodiment, a drive train for a bicycle is provided. The drive train includes an electric gear changer configured to change a gearing of the drive train, the electric gear changer having a connecting portion configured for removable attachment to a battery having a first coupling portion. The drive train also includes an intermediate power connector having a second coupling portion configured for removable attachment to the connecting portion of the electric gear changer. The intermediate power connector is configured to transmit power between a remote power source and the electric gear changer.

BRIEF DESCRIPTION OF DRAWINGS

FIG. 5B is the cross sectional view of the derailleur in FIG. 5A but with the battery partially attached and unlatched;

FIG. 7 illustrates a block diagram of a derailleur having an intermediate power element and/or connector according to one embodiment;

Other aspects and advantages of the embodiments disclosed herein will become apparent upon consideration of the following detailed description, wherein similar or identical structures have similar reference numerals.

DETAILED DESCRIPTION

Figure 1:
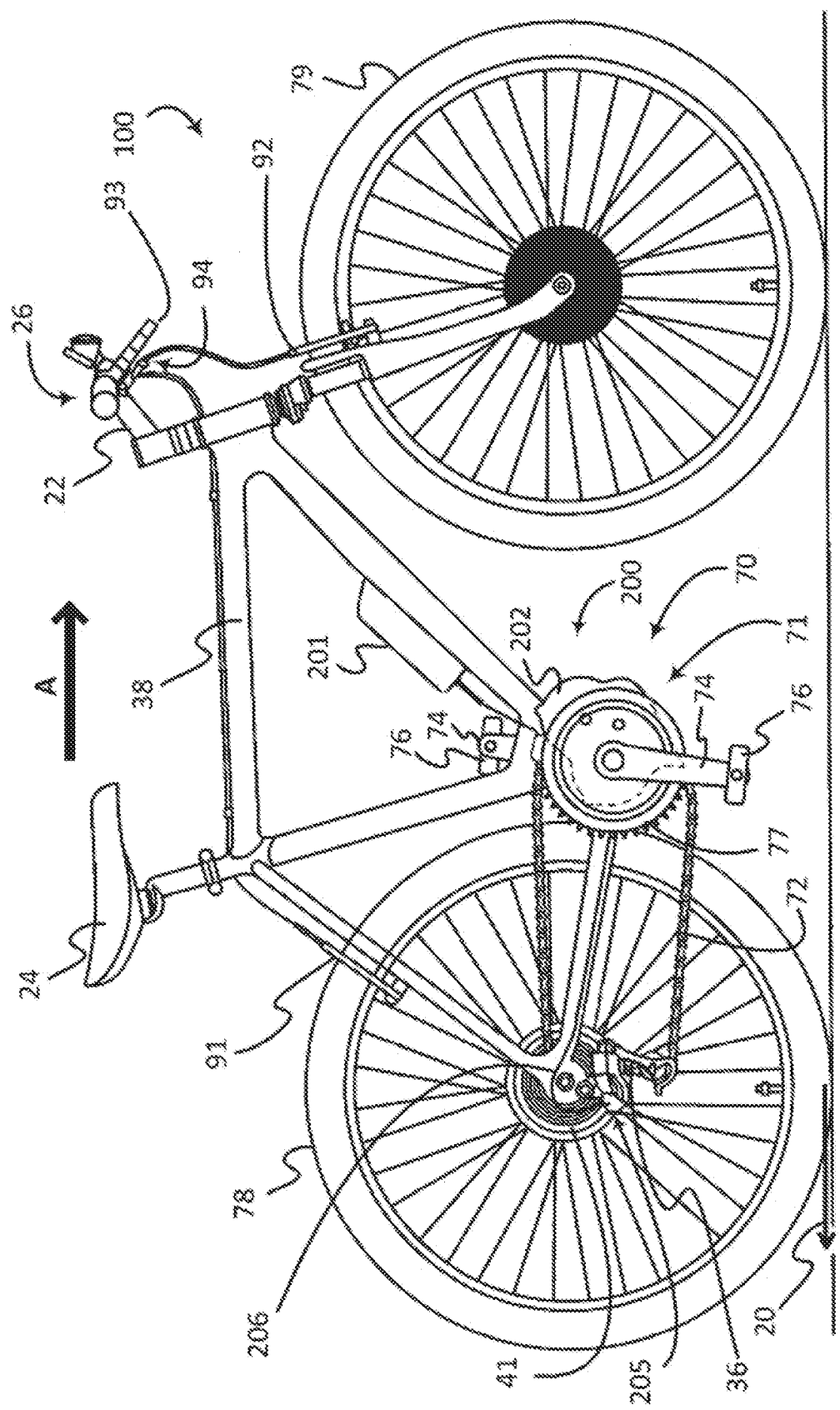
FIG. 1 is a right side elevational view of a bicycle according to one embodiment.

Integrating a wireless shifting system with an electric bike, or e-bike, can take advantage of the comparably large e-bike battery to power both the wireless shift devices and other e-bike components, such as a power assist motor. The e-bike battery is typically much higher in voltage and capacity than the rear derailleur battery. For example, 36 volts and 11 amp-hours is a typical size for such an e-bike battery. A component-level battery, such as the SRAM eTap™ battery, may be 8 volts and 300 milliamp hours. Therefore, even a nearly depleted e-bike motor can effectively provide power to a rear derailleur that is typically powered with a component level battery. There is a need to use the e-bike battery to power electric derailleurs that were designed first to work with discrete component-level batteries while making no or minimal changes to the derailleur.

It may also be advantageous in some cases to allow the e-bike system to control the operation of the derailleur. Either through manually operated user interfaces, like upshift and downshift switches, or automatically, by parameters determined by the e-bike system.

There are also issues to address when wireless security is considered with wireless communication systems. A shifting or derailleur system using wired communication as known in the prior art is self-contained and there is no chance of anyone taking over control of the shifting unless they are riding the bike. With a wireless communication system, the communication between the wireless components must be secure or someone besides the rider may be able to control the bike. One way to do this is to encrypt the communication. However, if one derailleur is configured to operate with several different e-bike systems, it becomes difficult to provide each e-bike system with access to the wireless transmission to communicate with the derailleur and still remain secure. Therefore, one problem to solve is how to allow various e-bike systems to power and control a wireless derailleur without making special versions of the derailleur for each e-bike system.

In an embodiment, an electric derailleur may be powered by an integrated power source or a remote power source and may include the specific geometry necessary to make this possible. The remote and/or integrated power source may be a battery. The integrated battery is configured for removable attachment to a connecting portion of the derailleur. The remote battery may be connected with the use of an intermediate power connector that includes a coupling portion configured to attach to the connecting portion of the derailleur. The intermediate power connector then includes a conductor that electrically communicates with a battery located remote and distinct from and/or attached separately to a bicycle from the derailleur. As such, the derailleur may be alternatively coupled to either the battery or the intermediate power connector to provide power to the derailleur. Also, the derailleur may be controlled by a wireless signal remote from the derailleur or a wired signal transmitted through the intermediate connector when coupled to the intermediate connector.

Embodiments of the invention will herein be described with reference to various figures. It will be understood that the figures and descriptions set out herein are provided for illustration only and do not limit the invention to only the disclosed embodiments. Also, the terms "first" and "second," "front" and "rear," or "left" and "right" are used in the detailed description for the sake of clarity and not as terms of limitation. Moreover, the terms refer to bicycle mechanisms conventionally mounted to a bicycle and with the bicycle oriented and used in a standard fashion unless otherwise indicated.

FIG. 1 illustrates an example bicycle 100, which may be used to implement a connection to a gear changer 36 using an intermediate power connector 205. In the illustrated embodiment, the bicycle 100 includes a frame 38, handlebars 22, and a seat 24. The bicycle 100 also includes a first or front wheel 79 and a second or rear wheel 78. A front brake 92 and/or a rear brake 91 are included to brake the front and rear wheels 79 78, respectively. The front and/or rear brake 92, 91 are controlled by a at least one brake actuator 93. The bicycle 100 includes a drive train 70. The drive train 70 of FIG. 1 includes a crank assembly 71 operatively coupled to a rear cassette 41 via a chain 72. The crank assembly includes crank arms 74 and pedals 76, as well as at least one chainring 77 configured to operatively couple with the chain 72 to transmit force and/or power exerted onto the crank assembly 70 to the chain 72. This force and/or power is transmitted to the rear cassette 41 by the chain 72, whereby a motivating force 20 and/or power is transmitted to the rear wheel 78 from the rear cassette 41. While the drive train 70 includes the gear changer, i.e., a rear derailleur 36 in the illustrated embodiment, other transmissions such as an internal gear hub, a gear box and/or a continuously variable transmission can be applied to the bicycle 100.

The drive train 70 may also include a power assist device 200. Pedaling torque is applied to the crank assembly 71 by a rider using the pedals 76 and crank arms 74. The power assist device 200 is configured to assist the rotation of the rear wheel 78. In the illustrated embodiment, the power assist device 200 is configured to assist the rotation of the wheel rear 78 via a coupled connection to the crank assembly 71. The power assist device 200 is powered by a remote power source 201.

The chain 72 may be moved between individual sprockets of the rear cassette 41 using the gear changer, such as the rear derailleur 36, as shown in FIG. 1. The gear changer or rear derailleur 36 in the disclosed embodiment is an electric gear changer, which is controlled by signals indicating that a shift command has been actuated by the bicycle operator, or rider. The electric rear derailleur 36 may be alternatively powered by an integrated power source or a remote power source 201, using a power conductive connector or cable 206 as is described herein. The power is provided from the remote power source 201 through the cable 206 to the intermediate power connector 205 that is coupled to the rear derailleur 36. The shift commands are implemented using an electric actuator 94, which is manually operable by the rider. The signals indicating the shift commands may be communicated to the electric rear derailleur 36 using wired and/or wireless communication techniques.

The rear derailleur 36 may also be configured to work with an integrated power source, such as a removable battery 300, for example as shown in FIGS. 3, 4A, 4B, and 5A. The intermediate power connector 205 may include an interface with the rear derailleur 36 that includes interface features similar to the removable battery 300 in order to electrically connect to the derailleur. This interface may have a portion that is removably connectable or coupleable to the rear derailleur 36. The intermediate power connector 205, or at least a connecting portion thereof, may also be smaller than the removable battery 300, as can be seen with a comparison between FIGS. 5A and 8A. As the intermediate power connector 205 will be transmitting power from the remote battery or power source 201, the intermediate power connector may include circuitry for transforming the electrical energy provided by the remote battery into a form that is usable by the derailleur 205. For example, the intermediate power connector 205 may include circuitry for voltage reduction, voltage rectification, as well as other power transformation circuitry and/or devices or combinations thereof. In an embodiment, the intermediate power connector 205 may also include communication circuitry and/or other devices. For example, the intermediate power connector 205 may include a wireless transmitter and/or receiver, CANbus to wireless translator, wired data connector, a CANbus to derailleur protocol translator, and/or other devices or circuitry and combinations thereof.

The bicycle 100 includes the power assist device 200 and is an electric bicycle, or e-bike, that has electric motor assist and electric shifting. As described above, the bicycle 100 has a frame mounted remote power source or remote battery 201 and a frame mounted rear derailleur 36, and a power assist motor 202. In other embodiments, the bicycle 100 may also include a front derailleur. As shown, the bicycle 100 also has a handlebar mounted user interface, by way of the shift actuator or electric actuator 94. All of these components may be connected to the remote power source or remote battery 201, as is described herein. Additionally, all the communication between the e-bike central control system or controller, and each component is achieved through wired or wireless communication. There may be discrete control with individual wires from the central controller to each component or the system may use a controller area network ("CAN") bus designed to allow microcontrollers and devices to communicate with each other in applications. E-bike central control systems are known in the prior art and are not otherwise shown or described herein.

While the illustrated bicycle 100 is a mountain bicycle and may include suspension components, such as a shock absorbing front fork 99, the embodiments disclosed herein may be implemented with other types of bicycles such as, for example, road bicycles. The front and/or forward orientation of the bicycle 100 is indicated by the direction of the arrow "A" in FIG. 1. As such, a forward direction of movement of the bicycle is indicated by the direction of the arrow A.

Figure 2:
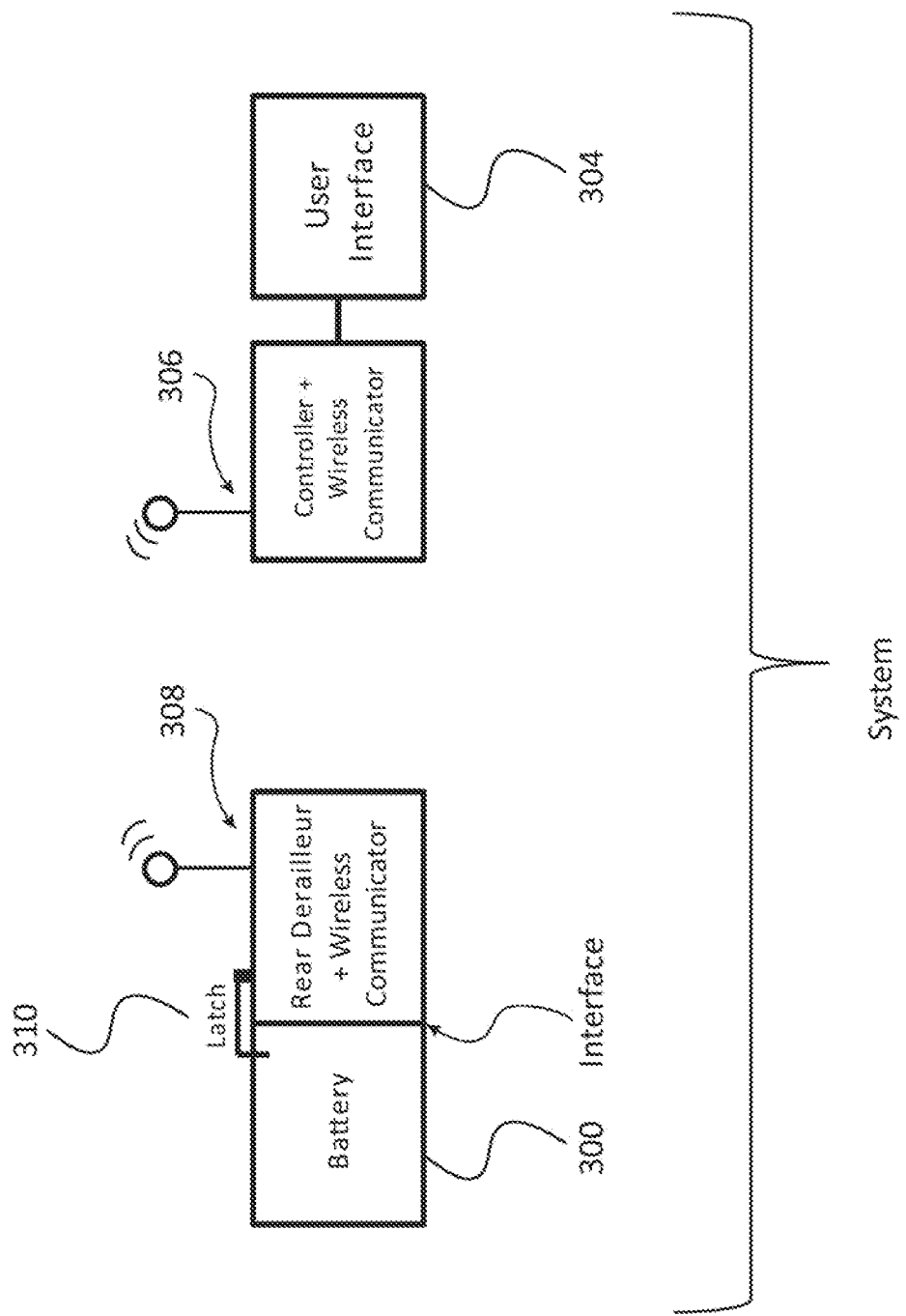
FIG. 2 illustrates a block diagram of a wireless rear derailleur having an attached battery according to one embodiment.

FIG. 2 represents the state of the art in wireless shifting systems, for example SRAM ETAP™. The system shown in FIG. 2 has multiple devices. The device to the right includes a User Interface ("UI") 304 and a controller, and a wireless communicator, hereinafter identified as the wireless communicator and controller 306. The device to the left includes the battery 300, a wireless communicator 308, and the rear derailleur 36. The user interface 304 is what the user interacts with to instigate a shift. In many cases, the user interface 304 is implemented as a pair of shift buttons, one for upshift and one for downshift. The user interface 304 could however be any interface the user interacts with that results in an initiation of a shift command or another change in gearing state of the rear derailleur 36. For example, the user interface 304 may be a button actuated to go from a manual shifting mode to an automatic shifting mode. In the automatic shifting mode, the UI 304 may indicate some adjustment of the automatic shifting parameters. For example, The automatic shifting mode may change the crank cadence, power, or bicycle speed at which automatic shifting occurs. The controller of the wireless communicator and controller 306 includes a controller which receives the commands from the user interface 304 and converts the commands to the protocol necessary for the wireless communication unit to operate securely.

The wireless communicator and controller 306 may include some pairing function whereby the UI 304 is uniquely paired with the rear derailleur 36 so that only the particular controller and UI is allowed to communicate with the particular derailleur. Pairing may be limited to one single device at each end or it may also include additional devices. For example, two independent sets of shifters may be able to control a single derailleur, but no more than two shifters may be paired with the derailleur. Or perhaps only one set of shifters and one non-shifter device, such as a smartphone or tablet, may be paired so as to be able to control a single derailleur. Alternatively, more than two shifters may be paired with the derailleur.

FIG. 2 on the left also shows the rear derailleur 36 and the wireless communicator 308, as well as the removable battery 300. The wireless communicator 308 communicates with the wireless communicator and controller 306 at the user interface 304. The wireless communicator 308 may communicate using any wireless technique. For example, Wifi, BLUETOOTH® Low Energy ("BLE"), Ant+™, and/or SRAM AIREA™, and other wireless communication techniques and/or protocols may be used. The wireless communicator 308 at the rear derailleur 36 may be a receiver only, or a transmitter and receiver. The wireless communicator 308 may be located on any part of the rear derailleur 36, including but not limited to the b-knuckle, inner link, outer link, p-knuckle or cage assembly.

Figure 3:
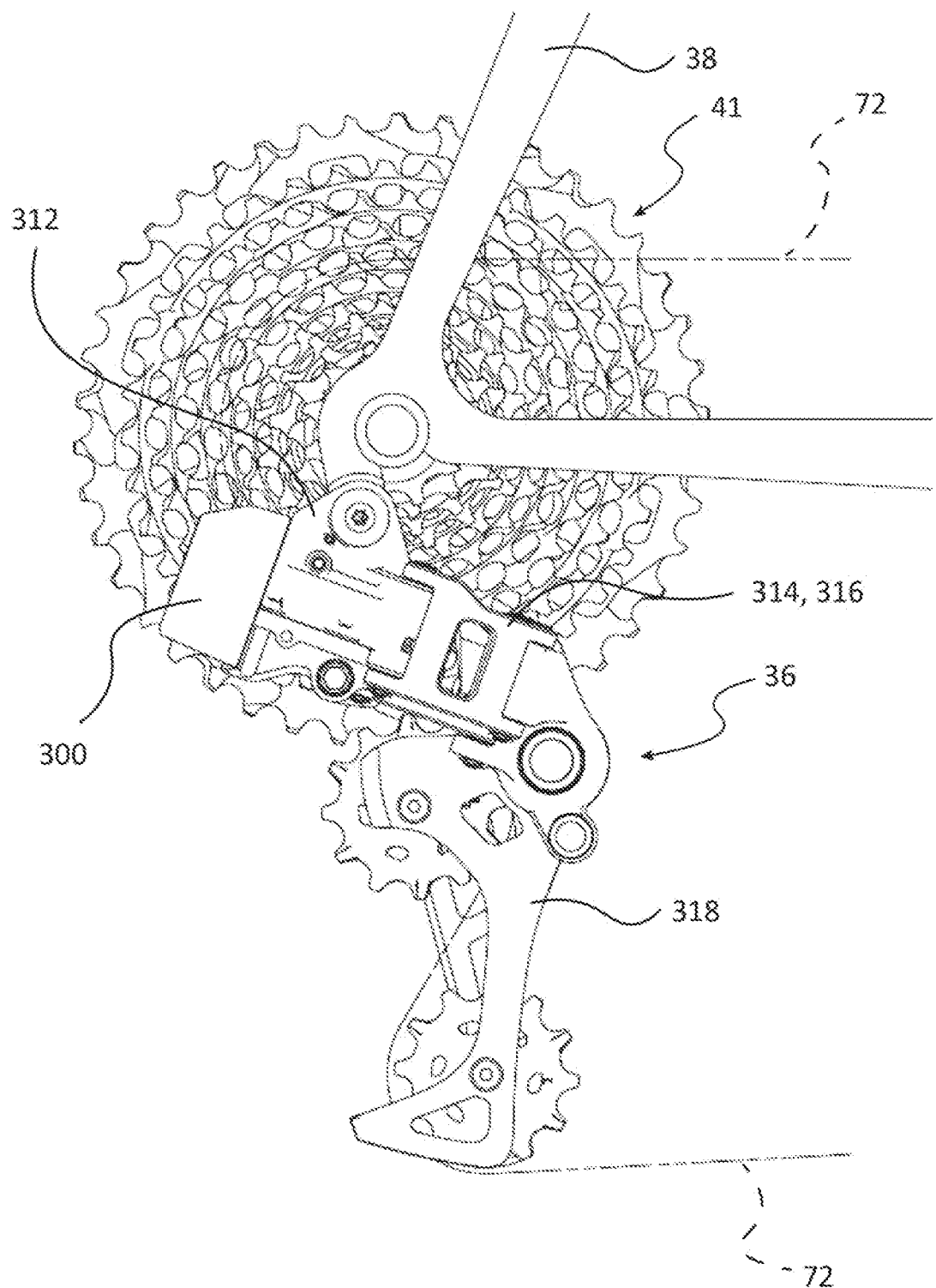
FIG. 3 illustrates a derailleur having the configuration in FIG. 2 and attached to a bicycle frame and positioned next to a rear cassette.

Additionally, the battery 300 can be attached to the rear derailleur 36, as is illustrated in FIG. 3, to allow the derailleur to be powered without a wired connection from the remote power source or remote battery 201, which is typically attached to a frame or other component of the bicycle 100. The battery 300 is held on to the rear derailleur 36 with a latch 310, which is schematically shown in FIG. 2. The battery 300 can be easily removed without tools but may also be modified to be retained with the use of a tooled interface. The battery 300 may include a Battery Management System ("BMS") to regulate use and charging. BMS is a technology that is used in modern lithium and/or lithium-ion based batteries.

FIG. 3 shows the rear derailleur in FIGS. 1 and 2 attached to the bicycle frame 38 and positioned next to the rear cassette 41. The chain 72 is only schematically shown in dashed lines. The basic structure of the electric, or electro-mechanical, rear derailleur 36 includes a base member 312, also referred to as a "b-knuckle," which is attachable to the bicycle frame 38 in a conventional manner, an outer link 314, and an inner link 316, which is pivotally attached to the base member by link pins, for example. A moveable member or assembly 318, also known as a "p-knuckle," is pivotally connected to the outer and inner links 314, 316 at an end opposite the base member 312 to permit displacement of the moveable assembly 318 relative to the base member.

Figure 4A:
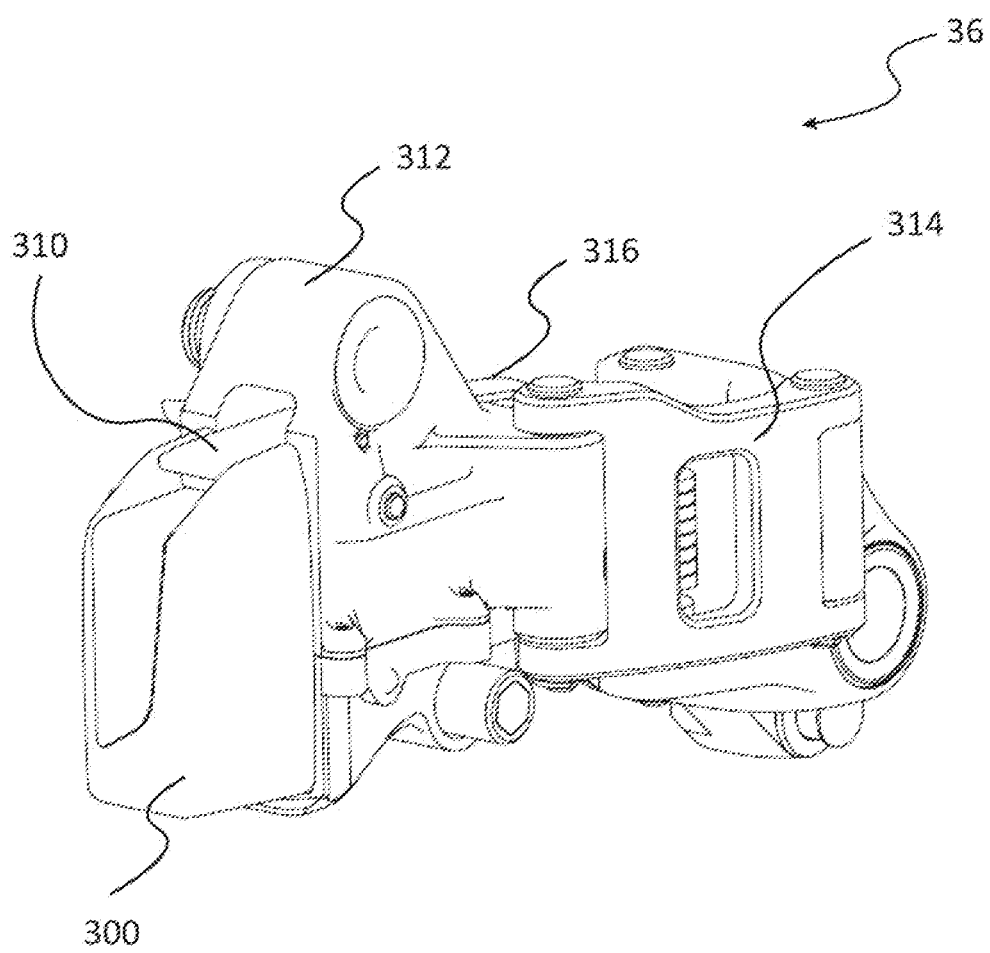
FIG. 4A is an orthogonal view of the derailleur in FIG. 3 with the battery attached and latched.
Figure 4B:
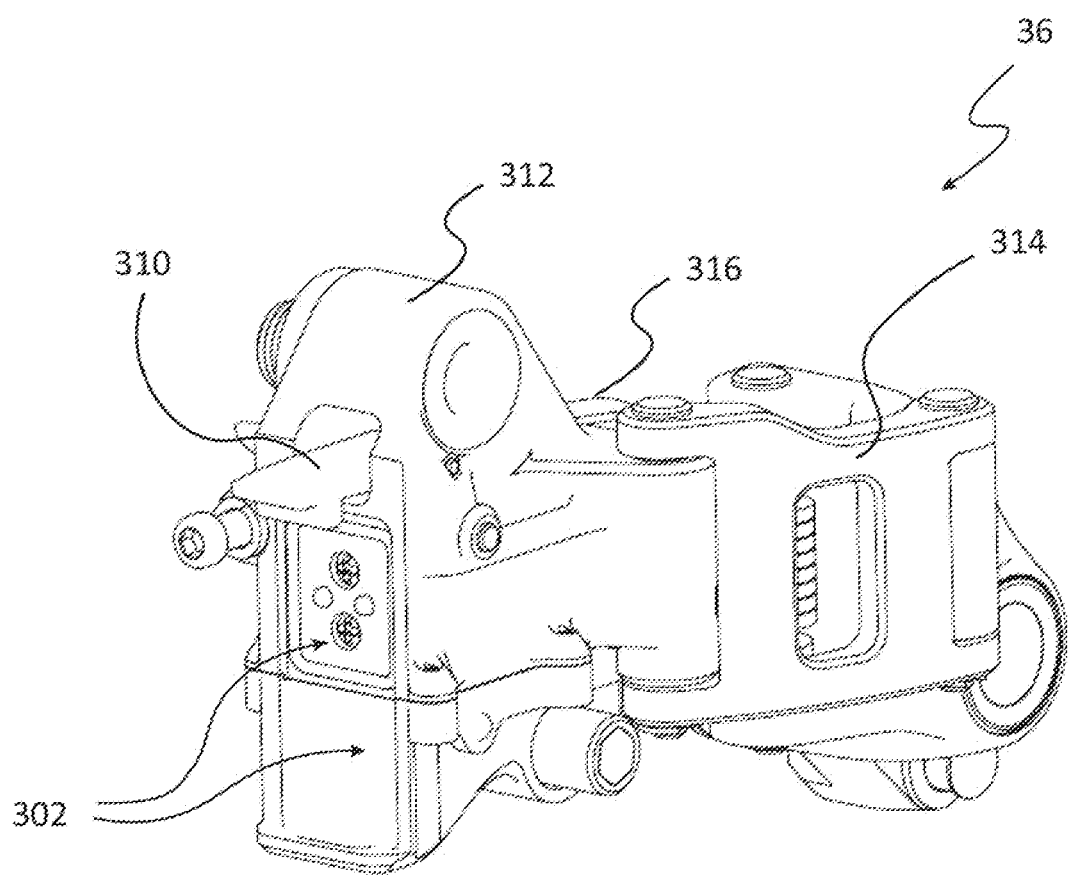
FIG. 4B is an orthogonal view of the derailleur in FIG. 3 with the battery removed.
Figure 5A:
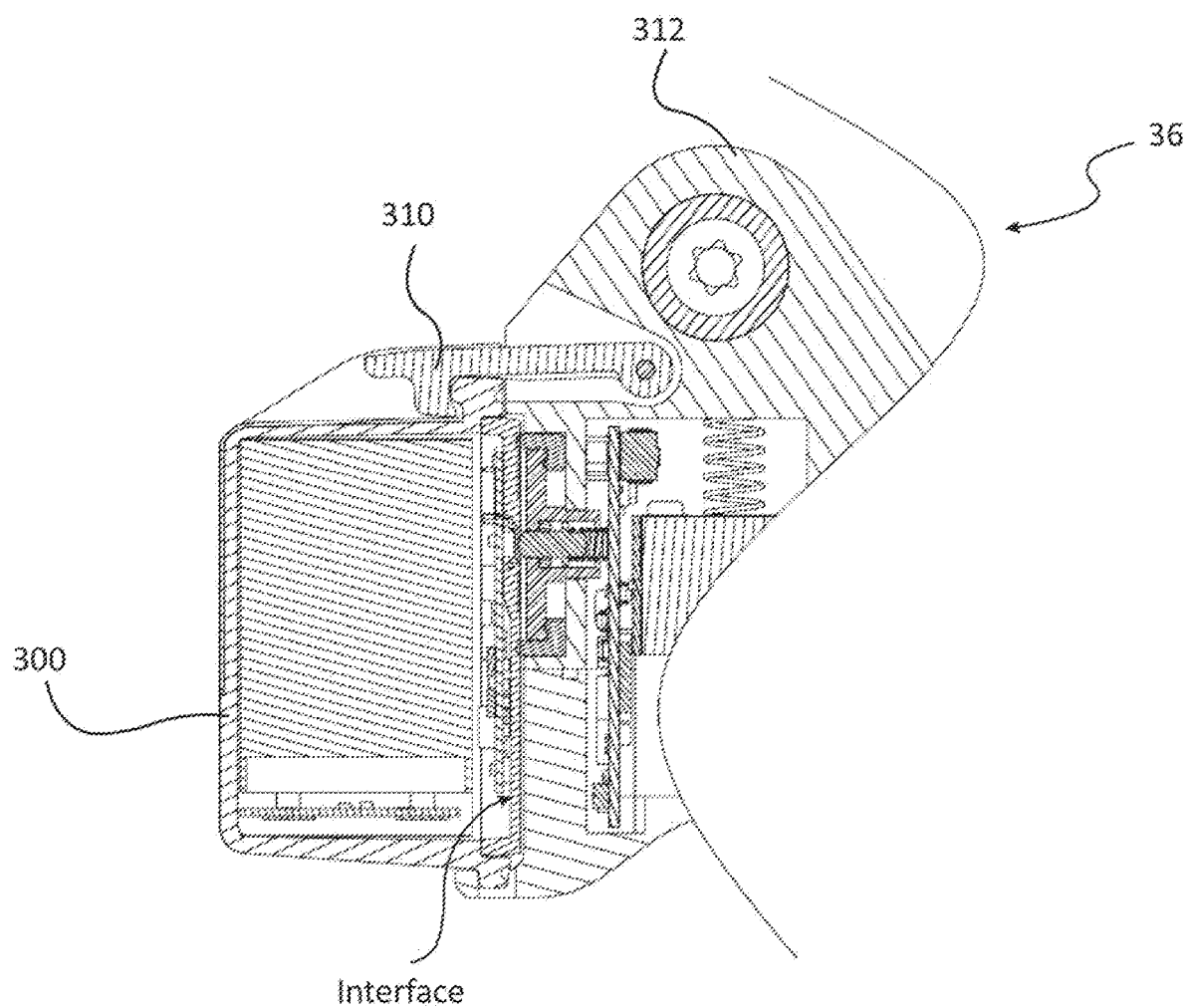
FIG. 5A is a cross sectional view taken along line 5A-5A of the derailleur in FIG. 4A with the battery attached and latched.
Figure 6:
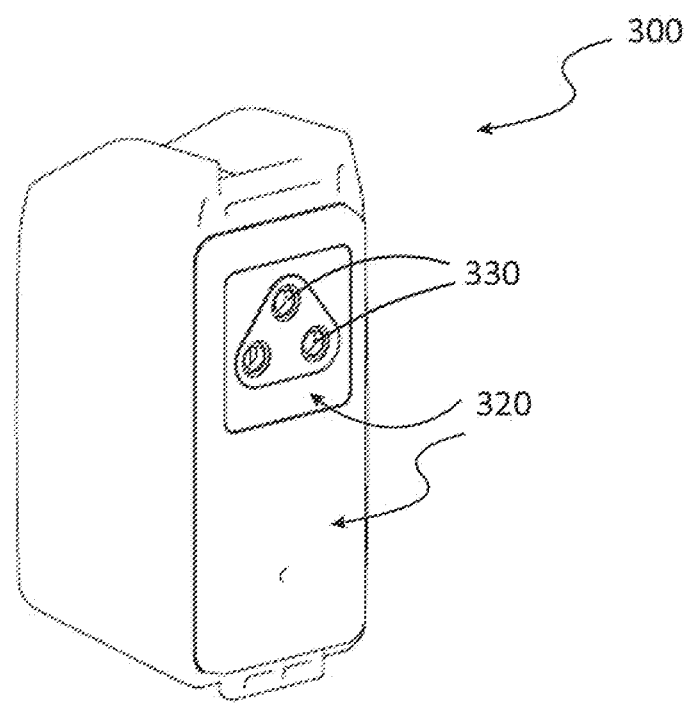
FIG. 6 is a perspective view of the battery in FIG. 3 illustrating a portion configured for connection to a bicycle component.

FIG. 4A is a perspective view of the rear derailleur 36 in FIGS. 2 and 3 with the integrated power source or battery 300 attached and latched. FIG. 4B is a perspective view of the rear derailleur 36 in FIGS. 2 and 3 with the battery removed. FIG. 5A is a cross-sectional view of the rear derailleur 36 in FIG. 4A with the battery 300 attached and latched. FIG. 5B is a cross-sectional view of the rear derailleur 36 in FIG. 4A but with the battery 300 partially attached and unlatched. FIG. 6 shows a perspective view of the battery 300 in FIGS. 2, 3, and 4A. As shown in these figures, the rear derailleur 36 (see FIG. 4B) defines a portion of the interface between the battery 300 and the derailleur. In this example, that interface portion is defined as a connecting portion 302 on a part of the derailleur. Likewise, the battery 300 (see FIG. 6) also defines a portion of this interface and that interface portion is defined herein as a battery coupling portion 320 on a part of the battery. The coupling portion 320 and the connecting portion 302 are configured to mechanically and electrically mate with one another so that the battery 300 can be attached to and provide power to the rear derailleur 36. In an embodiment, the interface may include a two or more part connection. For example, the interface may include one or both of a slot-protrusion and a latch attachment configured between mating parts. The interface can also, or alternatively, include a seal to protect the interface from the elements and contamination. The seal may be a compression face-to-face seal of the connecting components at the interface. In an embodiment, the coupling portion 302 includes at least one seal around electrical contacts of the interface. The coupling portion 302 may be attached to the derailleur using a plurality of fasteners around the electrical contacts. For example, two, three, or four screws may be used to attach the coupling portion 302 to the derailleur.

FIG. 7 introduces the use of an intermediate power and/or connector element, which may be referred to as a hot shoe or the intermediate power connector ("IPC") 205, as noted above. IPC is a term for a device that replaces an integrated power source or battery with a remote power source or battery. The IPC 205 is powered by a remote battery that may be an e-bike battery, such as the remote battery or power source 201. The IPC 205 also defines, when used in place of the integrated battery 300, a portion of an interface between the IPC and the rear derailleur 36. That interface portion is defined herein as an IPC coupling portion 322 and is configured to mechanically and electrically mate with the connecting portion of the rear derailleur 36. In this embodiment, the IPC coupling poertion 322 matches the interface 320 of the discrete battery 300. In the case of FIG. 7, the interface between the IPC 205 and the rear derailleur 36 also includes the latch 310, which is useable without tools. The IPC 205 can be smaller than the battery 300 that it replaces because the battery elements or cells may no longer included in the assembly. The IPC 205 also has the same electrical connection and sealing that the battery included. The IPC 205 may also reduce the voltage from the e-bike battery. For example, many e-bike batteries are 36 volt and many electric shifting systems are 8-12 volt systems. The IPC 205 may thus include voltage reduction circuitry that takes the 36 volts provided by the remote battery 201 and reduces it to something usable by the electric shifting system. Additionally, if an AC power supply was available, the IPC 205 may also rectify the current from an AC input to a DC output, suitable for use with the electric shifting system.

The system in FIG. 7 is controlled wirelessly, even though it is powered by a wired source remote from the rear derailleur 36. This allows a derailleur that was designed to be completely wireless, to have the advantage of a larger capacity e-bike battery and the advantage of no wires associated with the user interface.

Figure 8A:
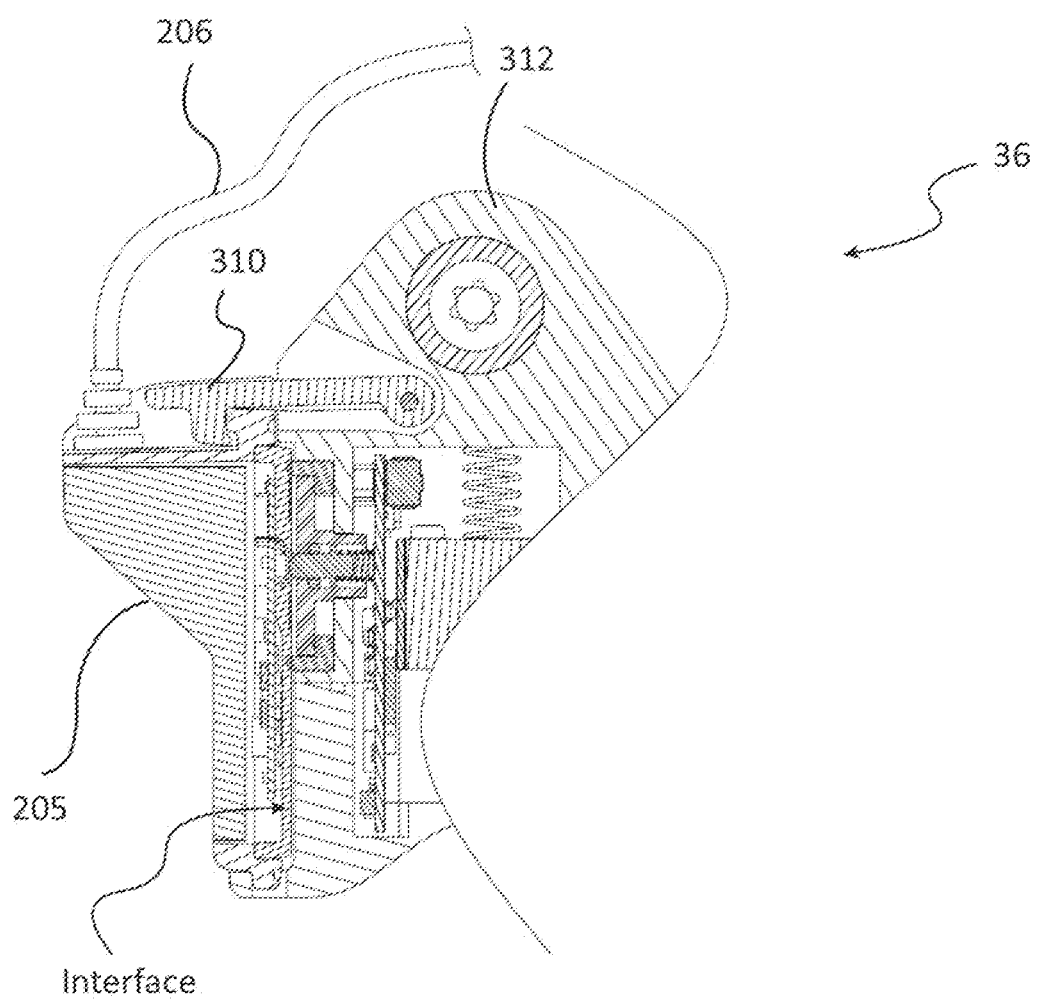
FIG. 8A is a cross sectional view of the intermediate power element and/or connector having the configuration in FIG. 7 with the power element and/or connector attached and latched.
Figure 8B:
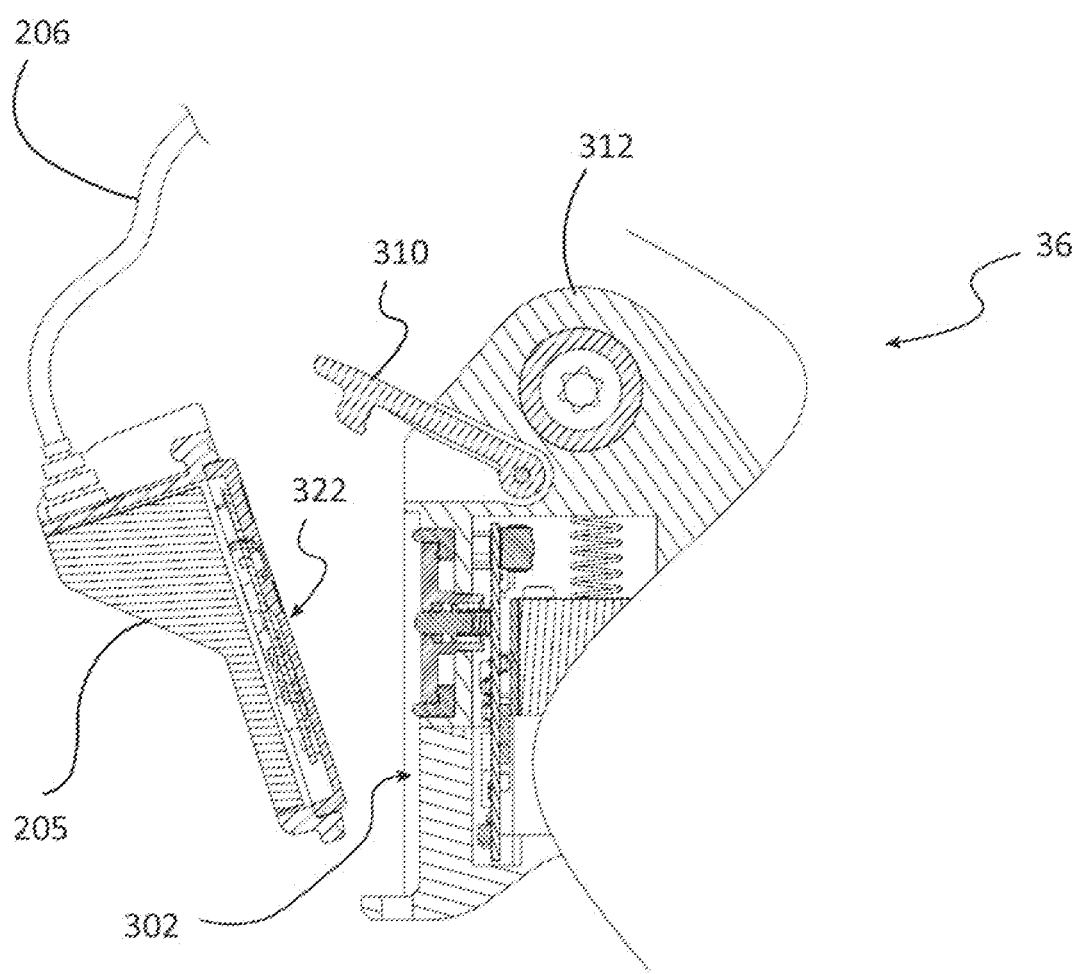
FIG. 8B is the cross sectional view of the intermediate power element and/or connector in FIG. 8A but with the power element and/or connector partially attached and unlatched.
Figure 9:
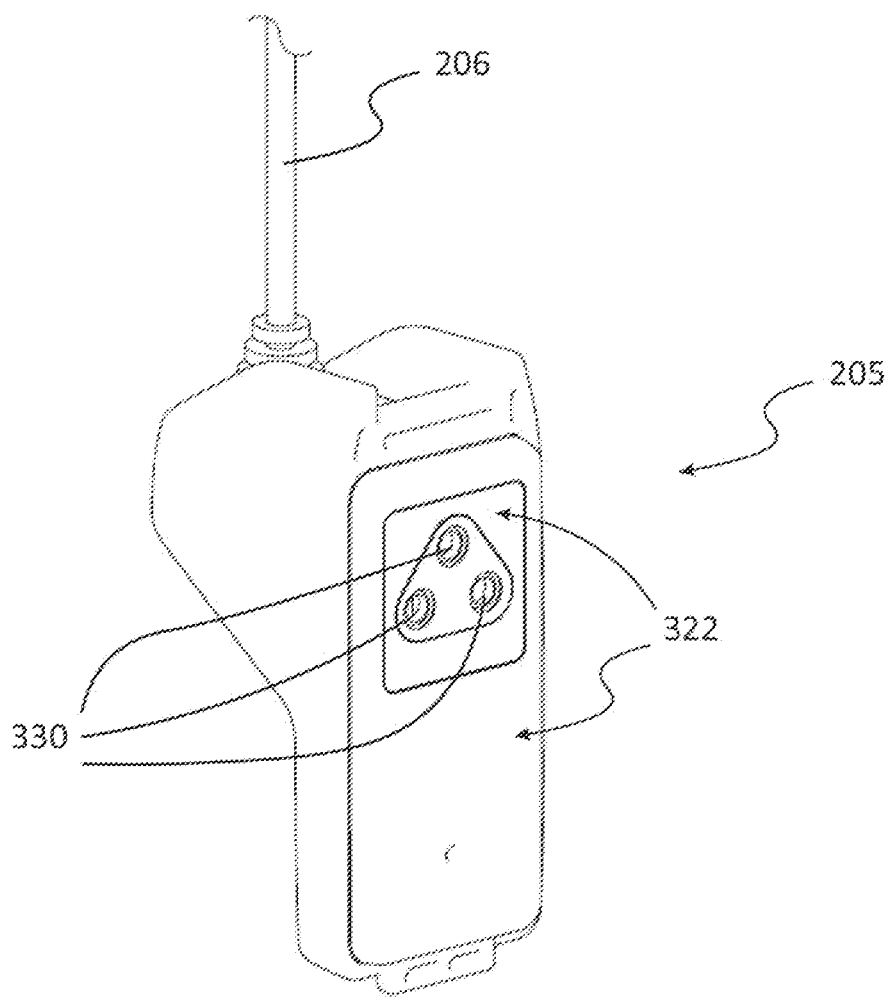
FIG. 9 is a perspective view of the intermediate power element and/or connector in FIG. 7 illustrating a portion configured for connection to a bicycle component.

FIG. 8A is a cross-sectional view of the IPC 205 in FIG. 7 with the IPC attached and latched. FIG. 8B is a cross-sectional view of the IPC 205 in FIG. 8A with the IPC partially attached and unlatched. The rear derailleur 36 may have the connecting portion 302 configured so that it is attachable to both the IPC 205 and the battery 300 as described with respect to FIGS. 2-6. For example, as shown in FIGS. 6 and 9 the IPC 205 and the battery 300 may have a same or similar coupling portion 322, 320, respectively, configured to communicatingly mate with a connection portion of the derailleur, for example the connecting portion 302 of the rear derailleur 36 as shown in FIG. 4B. The coupling portion 322 of the IPC 205 may include one or more conductors 330 configured for communicating power and/or data between the IPC and the rear derailleur 36. These may be pins or other types of connections. These conductors 330 may be configured and/or positioned the same or similarly on a surface of the cooupling portion on the battery 300 such that both the conductors of the IPC 205 and the battery 300 communicate power to the rear derailleur 36 through the conductors. In an embodiment, the IPC 205 may include an additional conductor to communicate data with the derailleur. Alternate data and/or power communication techniques may also be used. In an embodiment, the IPC 205 and/or battery 300 may communicate power with the derailleur using wireless techniques. For example, inductive power transfer techniques may be used.

Figure 10:
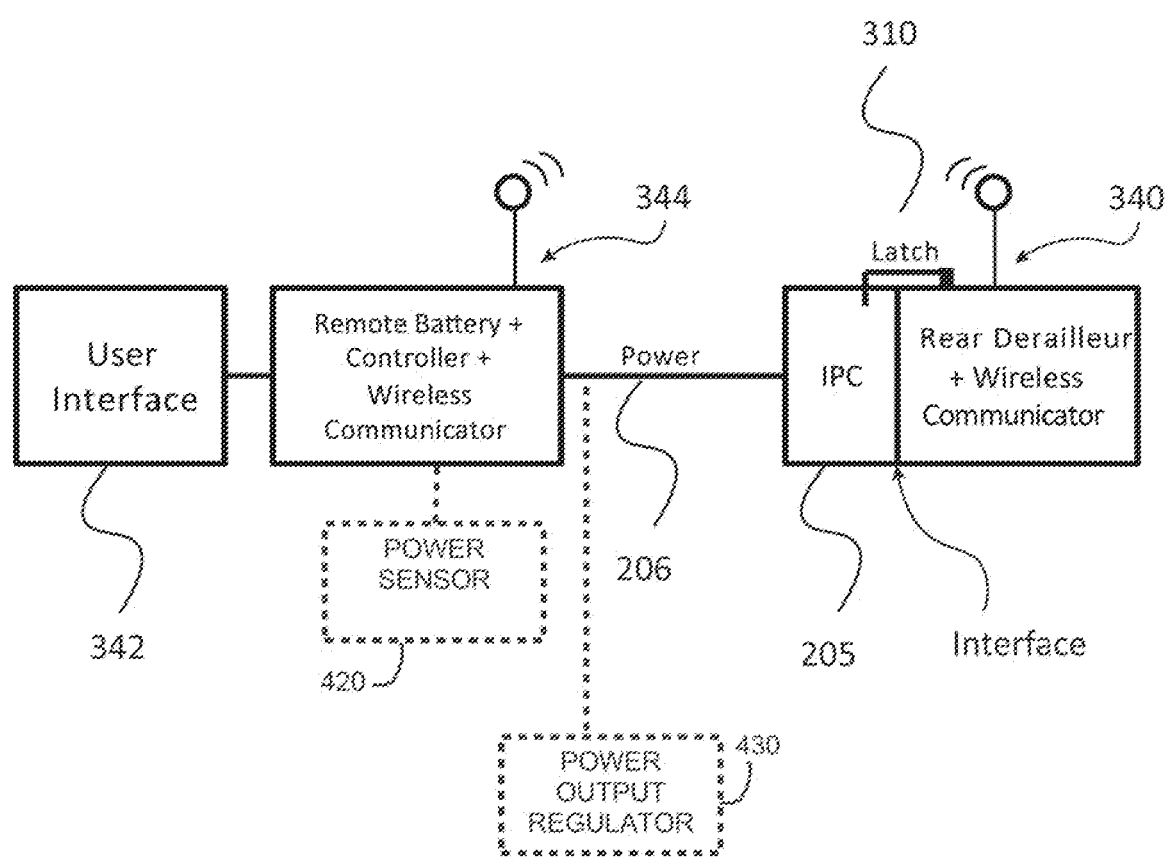
FIG. 10 illustrates a block diagram of a derailleur having an intermediate power element and/or connector according to one embodiment.

FIG. 10 shows another embodiment of an e-bike system using an IPC. In FIG. 10, the wireless communication system is integrated into the e-bike system. In this way an e-bike system may control the movement of a wireless derailleur 340 by sending shift signals directly from the bike system 344, which includes the remote battery 201, a wireless communicator, and a controller . These shift signals may be instigated from a user interface 342 like a shift button associated with the e-bike system 344 or the e-bike system may use some other parameter to control the derailleurs 340 automatically. At the same time the e-bike system will power the derailleur 340 by the wire 206 from the main e-bike battery using the IPC.

The wireless communication from the e-bike system 344 to the derailleur 340, and in reverse, may be encrypted or somehow controlled to protect against outside influence like radio interference or an external device maliciously trying to shift the system. In this way the controller of the e-bike system 344 may be paired with the derailleur 340 so that only the e-bike controller may provide control signals to the derailleur. This pairing may occur on the devices by pressing buttons on each device to initiate the pairing sequence. The devices may also be paired to each other by a third device like a mobile computing device, smartphone, or tablet where the third device can first be paired with the individual devices and then used to pair the individual devices together.

Figure 11:
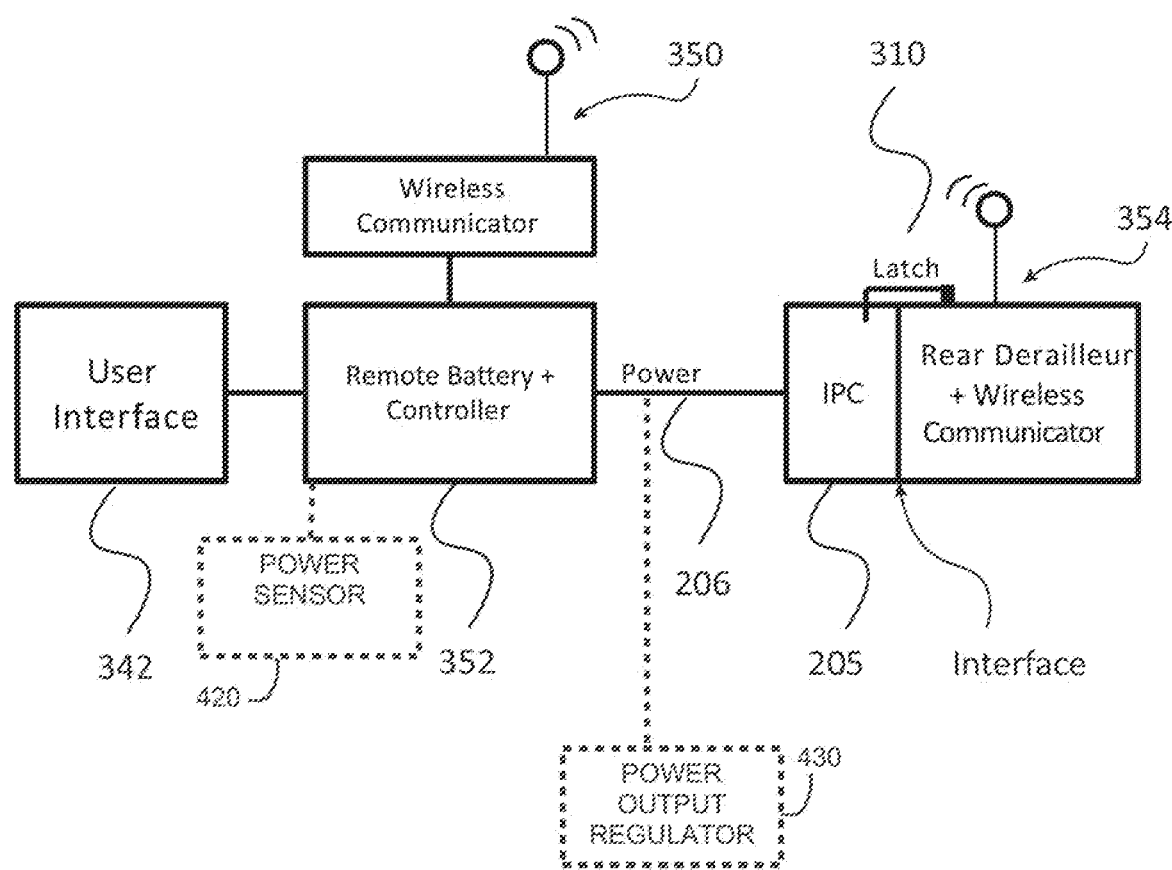
FIG. 11 illustrates a block diagram of a derailleur having an intermediate power element and/or connector according to one embodiment.

FIG. 11 shows another embodiment of an e-bike system using an IPC. In this embodiment a wireless communicator 350 is separate from but electrically connected to a remote battery and controller of an e-bike system 352. In this scenario, for example an e-bike system 352 still controls a derailleur 354 but a separate electrical component is used to wirelessly communicate with the electric shifting system. The wireless communication unit or communicator 350 may be a separate component from the shifting system, allowing the e-bike system 352 to either include or exclude the wireless communication depending on connection with the wireless communication unit. The e-bike system 352 could communicate shift requirements to the wireless communicator 350 in a protocol native to the e-bike system and the wireless communicator could translate these shift requirements into a wireless signal that is recognizable to the shifting system. In this way a producer of the shifting system could control both the production of both the transmitting and receiving parts of the wireless system and thereby need not share the wireless protocol with the e-bike system.

Figure 12:
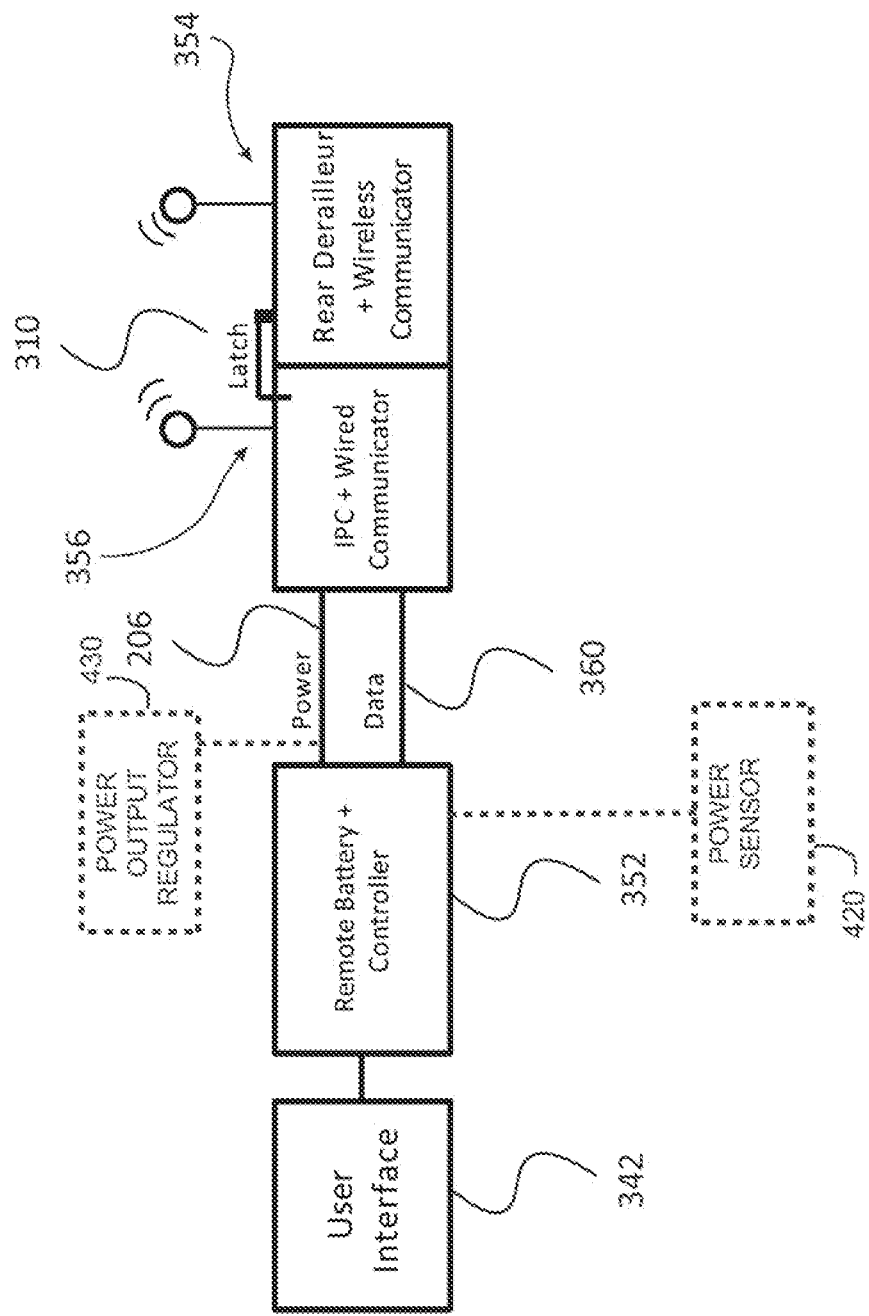
FIG. 12 illustrates a block diagram of a derailleur having an intermediate power element and/or connector according to one embodiment.

The embodiment shown in FIG. 12 is similar to the embodiment shown in FIG. 11, except that the wireless communicator 350 that is electrically attached to the remote battery and controller of the e-bike system 352 in the embodiment shown in FIG. 11 is instead mechanically attached to the derailleur 354 as part of an IPC 356 in the embodiment shown in FIG. 12. Power travels through one ("1"), two ("2"), or more wires 206 from the battery through the IPC 356 into the derailleur 354. Separately, data related to shift requirements, such as data indicating shift signals, is also sent to the IPC 356 via one ("1") or more wires 360. This data may be transmitted to the IPC 356 as a CANbus or other system protocol and then be converted at the IPC into a wireless protocol that the derailleur 354 can understand. This transformation may be performed using an appropriate translator. The derailleur 354 will have a wireless receiver, as in all previously described embodiments, to be able to read this wireless transmission. This wireless receiver may be located at the derailleur 354 on the b-knuckle, p-knuckle, inner or outer links as the inner or outer cage plates for example. One benefit of this is that the distance from the IPC 356 to the derailleur 354 may be small and it would be possible to achieve wireless transmission with very small signal interference. For example, the transmitter and receiver may be oriented such that they are within line of sight of each other or such that only separated by radio frequency ("RF") transparent materials that allow wireless signals to easily pass through. In this way wireless communication would more secure and more stable.

Figure 13:
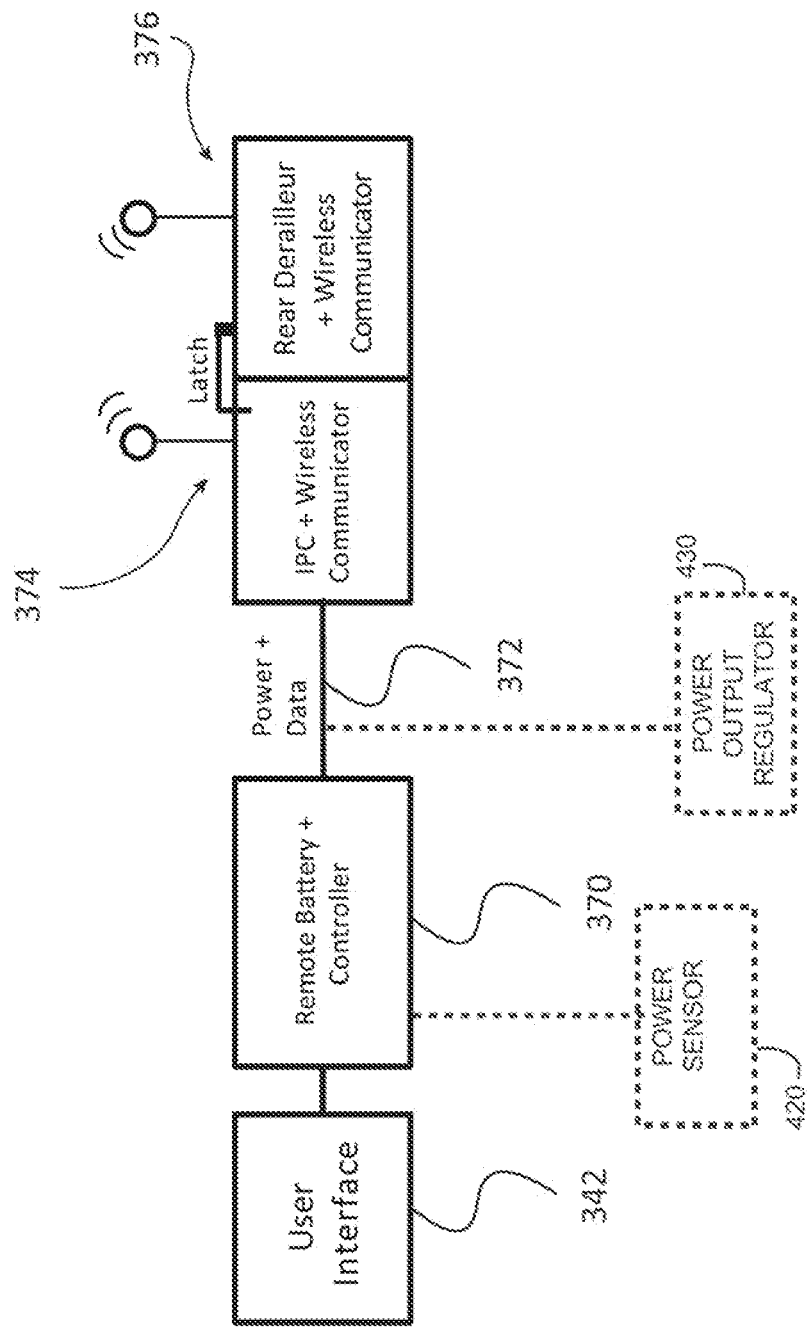
FIG. 13 illustrates a block diagram of a derailleur having an intermediate power element and/or connector according to one embodiment.

The embodiment shown in FIG. 13 is similar to the embodiment shown FIG. 12, except that data and power both are communicated from the remote battery/controller of an e-bike system 370 on a single transmission path or conductor 372. This uses fewer conductors, which makes the wire lighter. In this embodiment, an IPC 374 needs to then be able to read the data instructions from the power line, and if necessary, translate the data into a wireless protocol and send this data to the corresponding receiver at a derailleur 376. In an embodiment, center tap techniques are used to communicate both power and data through the singular path or conductor 372. For example, the IPC 374 may include a center tapped transformer, inductor, resistor, or potentiometer to introduce the data to the conductor. The derailleur 376 would include reciprocal devices and/or circuitry to distinguish the data and power signals.

Figure 14:
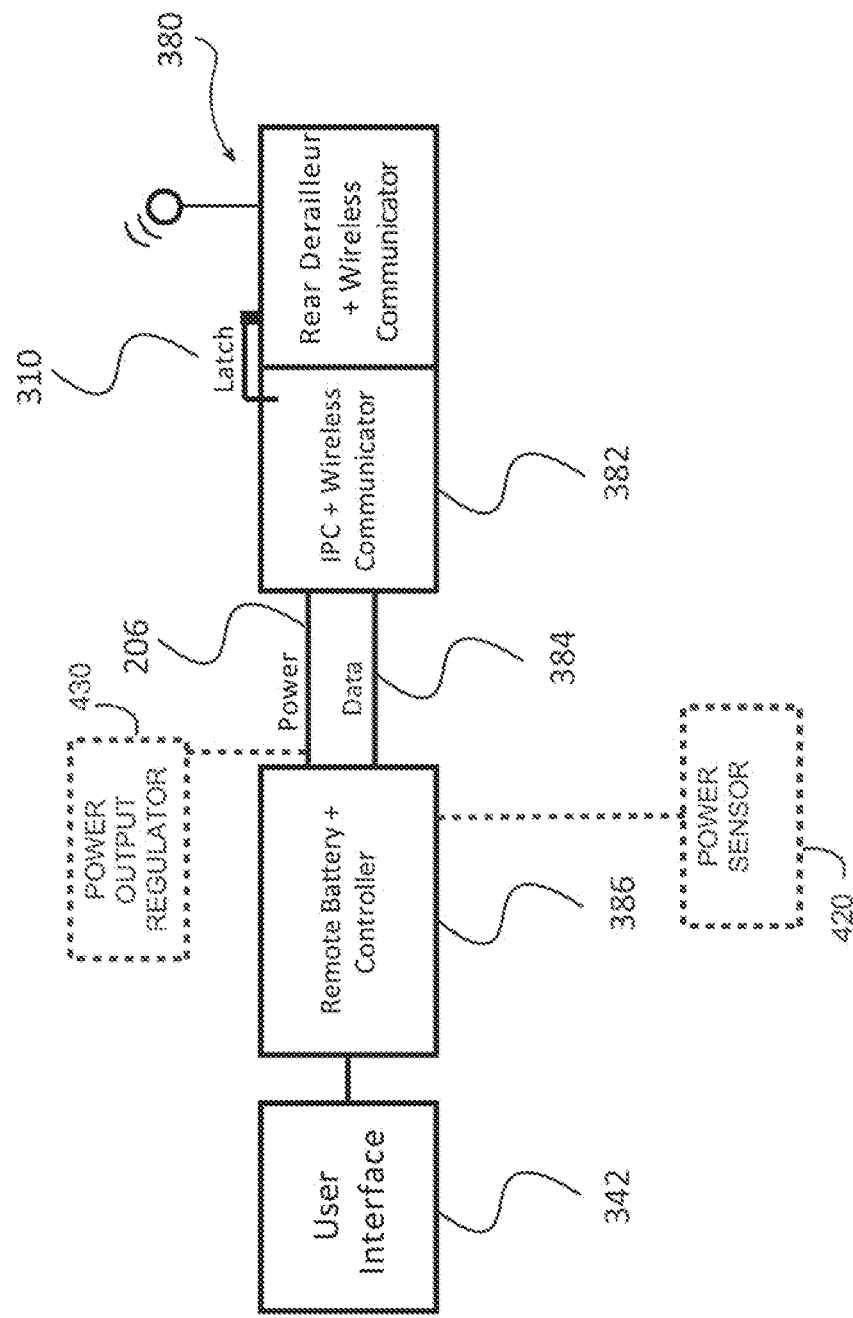
FIG. 14 illustrates a block diagram of a derailleur having an intermediate power element and/or connector according to one embodiment.

The embodiment shown in FIG. 14 is similar to the embodiments shown in FIGS. 12 and 13, except that in FIG. 14 a derailleur 380 may be controlled by a wireless transmission from a wireless communicator, which is part of an IPC 382 or by a transmission through a wired connection 206, 384. The derailleur 380 may have, at the battery/IPC connection, four ("4") separate electrical contacts, two for power and two for data. When the integrated battery 300 is attached directly to the derailleur 380, and the data contacts are not used, the derailleur may default to wireless communication mode and the wireless subsystem will be active and be powered by the attached battery 300. When the IPC 382 is used, it may electrically connect with the derailleur 380 at all four contacts. Power and data may be communicated from the e-bike system 386, including the remote battery 201 and a controller, to the derailleur 380. This contact with the data leads 384 may tell the derailleur 380 to act as a wired derailleur. For example, this contact may be detected by the presence of signals in the conductors, or through the physical pressure applied to the pins through the connection. In a wired data IPC connection, the wireless components would be turned off and only accept shift commands through the wired data from the IPC 382 directly.

In an embodiment, the wireless connection may always be available even when the IPC is used for wired data communication. This would allow the bike to be controlled by the e-bike controller at some times, such as when the system is in an automatic shifting mode, and alternatively controlled at the handlebar by a wireless shifting system when the shifting is in a manual mode.

Embodiments of the invention are described herein with reference to a rear derailleur. However, embodiments of the invention may be included in either a front or rear derailleur, or both at the same time. Embodiments of the invention may also be included with other gear changers, such as multi-gear internal hubs and other types of variable transmissions. Also, embodiments of the invention may be included with other wireless bicycle component such as an adjustable seat post or suspension components such as a fork or shock. It also applies to various sensors that were originally wireless such as power meters, speed sensors, and computers.

Each component may have only wireless transmitters, receivers or both depending on the nature of the wireless protocol. For example, with some protocols a message is sent wirelessly but the protocol demands a receipt response to ensure that the message has been delivered. Thus, all components need be capable of wireless transmission and receiving.

The communicator and/or controller as described herein and incorporated into the remote battery structure, the intermediate power connector, and/or the gear changer may be implemented using circuitry and with one or more printed circuit boards that may be used to implement embodiments of the invention. The communicator and/or controller circuitry may include a processor, a memory, and/or a communication device such as radio electronics operable to transmit and/or receive radio signals. Additional, different, or fewer components are possible.

Figure 15:
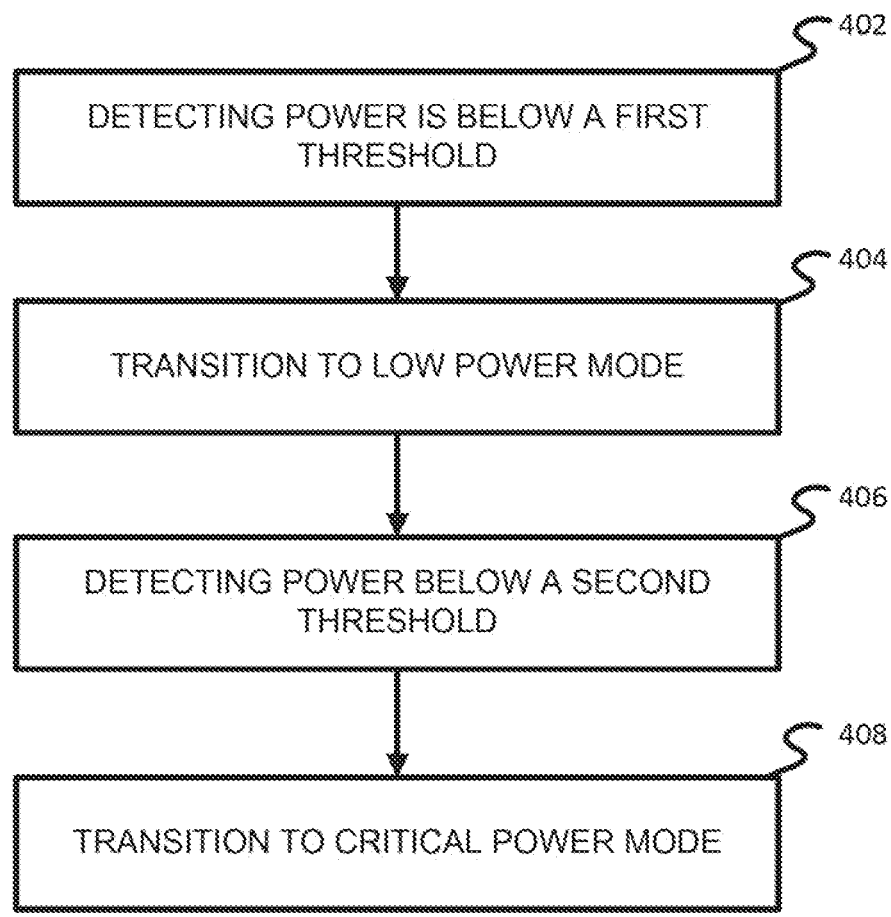
FIG. 15 illustrates a flow chart of an example embodiment for a method of controlling an e-bike.

FIG. 15 illustrates a flow chart of an example embodiment for a method of controlling an e-bike, particularly as it relates to power use modes of an e-bike. As presented in the following sections, the acts may be performed using any combination of the components indicated in FIGS. 7 and 10-14. For example the following acts may be performed by a controller as integrated with the e-bike system. Additional, different, or fewer acts may be provided. The acts are performed in the order shown or other orders. The acts may also be repeated and/or performed at multiple times throughout the method.

In an embodiment, the e-bike system, for example a processor integrated with the e-bike system, may be configured to control power provided from a remote power source (e.g. remote battery 201 of FIG. 1). FIG. 15 illustrates such an embodiment that involves controlling power of an e-bike system. In a standard operational mode the e-bike system may be configured to provide power to both an e-bike gear changer, such as a rear derailleur 36, and a power assist motor 202. The e-bike system may include an optional sensor 420 configured to determine a power level of the remote power source and/or an optional power output regulator 430. If the power level is determined to be below a first threshold (Act 402), or low level threshold, for example below a 15 percent total power capacity value of the remote power source, the e-bike system may be configured to transition to a low power operational mode (Act 404). In an embodiment, the low power operational mode causes the e-bike system to cause the power output regulator reduce or eliminate the power provided to the power assist motor, while still providing power to the e-bike gear changer. This configuration can maintain gear changing operation of the bicycle while relying on the rider for motive force while the bicycle is in low power operational mode. Also, or alternatively, in an embodiment the e-bike system may be configured to cause the power output regulator to transition to a critical power mode (Act 406), for example to eliminate power to both the e-bike gear changer and the power assist motor, when it is detected that the remote power source is below a critical power threshold, or second threshold (Act 408).

In an embodiment, the e-bike system includes both the critical power threshold and the low power threshold, with the critical power threshold being smaller than the low power threshold. For example, the critical power threshold may be a 5 percent total power capacity value of the remote power source, and the low power threshold may be a 15 percent total power capacity value of the remote power source. In an embodiment, Acts 402-408 are included. In another embodiment, either Acts 402 and 404, or Acts 406 and 408, are included. In an embodiment, the method may also include detecting when the remote power source is above the critical power threshold and/or the low power threshold, and transition to the appropriate e-bike power mode. For example, if it is detected that the remote power source is above the critical power threshold but below the low power threshold, the e-bike may transition from the critical power mode to the low power mode. If it is detected that the remote power source is above the low power threshold, but was previously below the low power threshold, the e-bike may transition from the low power mode to standard operational power mode.

The processor may include a general processor, digital signal processor, an application specific integrated circuit ("ASIC"), field programmable gate array ("FPGA"), analog circuit, digital circuit, combinations thereof, or other now known or later developed processor. The processor may be a single device or combinations of devices, such as through shared or parallel processing. In one embodiment, for example, the CPU used may be an Atmel® ATmega324PA microcontroller with an internal eeprom memory.

The radio circuitry is configured to communicate the control signals wirelessly between one or multiple bicycle components. The control signals may be communicated wirelessly using any technique, protocol, or standard. For example, Institute of Electrical and Electronics Engineers ("IEEE") 802.11 standards, IEEE 802.15.1 or BLUETOOTH® standards, ANT™ or ANT+™ standards, and/or SRAM AIREA™ standards may be used. In an embodiment, the radio circuitry may include a transmitter and receiver such as an Atmel® AT86RF231 2.4 GHz transceiver utilizing Advanced Encryption Standard ("AES") encryption and Direct-Sequence Spread ("DSS") spectrum technology supporting 16 channels and the IEEE 802.15.4 communication protocol.

The memory may be a volatile memory or a non-volatile memory. The memory may include one or more of a read only memory ("ROM"), random access memory ("RAM"), a flash memory, an electronic erasable program read only memory ("EEPROM"), or other type of memory. The memory may be removable from the system control device, such as a secure digital ("SD") memory card. In a particular non-limiting embodiment, a computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding, or carrying a set of instructions for execution by a processor or that cause a computer system to perform any one or more of the methods or operations disclosed herein.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply is a portable power supply, which may be stored internal to the system control device. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply may include a combination of multiple batteries or other power providing devices. Specially fitted or configured battery types, or standard battery types such as CR 2012, CR 2016, and/or CR 2032 may be used. In an embodiment, a specially fitted lithium type battery is used.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as the system control device. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory or memories that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or may be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device to name just a few. Computer readable media suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, inventive subject matter may be directed to less than all of the features of any of the disclosed embodiments. It is intended that the foregoing detailed description be regarded as illustrative rather than limiting.

The invention claimed is:

1. A bicycle system, comprising:
a remote power supply;
an electric gear changer configured to change a gearing of a drive train of a bicycle, the electric gear changer being a derailleur and including a first wireless communicator; and
an intermediate power connector ("IPC"), the IPC configured for attachment to the electric gear changer, wherein the IPC is configured to transmit power between the electric gear changer and the remote power supply, wherein the remote power supply includes a second wireless communicator configured to send wireless shift signals to the first wireless communicator.

2. The system of claim 1, wherein a cable transmits power from the remote power supply to the IPC.

3. The system of claim 1, wherein the remote power supply provides power to a motor.

4. The system of claim 3, wherein a level of power of the remote power supply is configured to impact an amount of power received by the motor.

5. The system of claim 4, further comprising:
a power output regulator configured for connection to the remote power supply.

6. The system of claim 5, wherein the power output regulator is configured to adjust power provided to the motor based on the level of power of the remote power supply.

7. The system of claim 1, further comprising:
a controller.

8. The system of claim 7, wherein the controller is located on the remote power supply.

9. The system of claim 1, further comprising:
a power sensor configured to connect the remote power supply.

10. The system of claim 1, wherein the electric gear changer also includes a battery configured for removable attachment to a connecting portion of the electric gear changer, wherein the battery and the IPC are selectively attachable to the connecting portion of the electric gear changer.

11. The system of claim 10, wherein the battery and the power supply provide power at different voltages to the electric gear changer, and wherein the electric gear changer is configured to compensate for the different voltages.

12. The system of claim 1, wherein the remote power source is a remote battery that is positioned remote from the electric gear changer.

13. The system of claim 1, further comprising:
a user interface, wherein the user interface includes a second wireless communicator.

14. The system of claim 13, wherein the second wireless communicator wirelessly transmits signals from the user interface to the first wireless communicator.

* * * * *